(12) United States Patent
Katz

(10) Patent No.: US 6,423,770 B1
(45) Date of Patent: Jul. 23, 2002

(54) SILICATE MATERIAL AND PROCESS FOR FABRICATING SILICATE MATERIAL

(75) Inventor: Howard E. Katz, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/353,898

(22) Filed: Jul. 15, 1999

(51) Int. Cl.$^7$ .................................................. C08K 3/00
(52) U.S. Cl. ..................................... 524/492; 524/493
(58) Field of Search ................................ 524/492, 493

(56) References Cited

U.S. PATENT DOCUMENTS

| | | | |
|---|---|---|---|
| 2,315,328 A | 3/1943 | Hood | 49/92 |
| 3,658,526 A | 4/1972 | Haugh | 96/27 |
| 4,338,375 A | 7/1982 | Hashimoto | 428/412 |
| 4,798,629 A | 1/1989 | Wood | 106/287.16 |
| 4,842,968 A | 6/1989 | Kojima | 430/1 |
| 5,196,282 A | 3/1993 | Knobbe | 430/2 |
| 5,543,251 A | 8/1996 | Taylor | 430/1 |
| 5,874,187 A | 2/1999 | Colvin | 430/2 |

OTHER PUBLICATIONS

Ryong Ryoo et al., Optically Transparent, Single–Crystal–Like Oriented Mesoporous, Silica Films and Plates, J. Phys. Chem. B. vol. 101, No. 50 (1997).

Galen D. Stucky et al., Triblock–Copolymer–Directed Syntheses of Large–Pore Mesoporous Silica Fibers, *Chem. Mater.*, vol. 10, No. 8 (1998).

Makoto Ogawa et al., Preparation of Self–Standing Transparent Films of Silica–Surfactant Mesostructured Materials and the Conversion to Porous Silica Films. Adv. Mater., 10, No. 14 (1998).

Thomas J. Pinnavaia et al., Unstable Mesostructured Silico Vesicles, Science vol. 282 (Nov. 13, 1998).

Louis Mercier, Direct Sythesis of Functionalized Silica by Non–Ionic–Alkylpolyethyleneoxide Surfactant Assembly, Chem. Commun. pp. 1775–1776 (1998).

Iqbal Gill et al., Encapsulation of Biologicals within Silicate, Siloxane, and Hybrid Sol–Gel Polymers: An Efficient and Generic Approach, J. Am. Chem. Soc. 120, pp. 8587–8598 (1998).

K. M. McGrath et al, Formation of a Silicate $L_3$ Phase with Continuously Adjustable Pore Sizes, Science vol. 277 pp. 552–555 (1997).

C.J. Brinker, "*Sol–Gel–Science*", Academic Press, New York (1990).

L.B. Glebov et al., Photorefraction in "Pourous Xerogel–Photopolymer" *Composite Materials*, Sov. Tech. Phys. Lett. 16(6) pp. 45–46 (Jun. 1990).

*Primary Examiner*—Edward J. Cain
(74) *Attorney, Agent, or Firm*—Schnader Harrison Segal & Lewis, LLP

(57) ABSTRACT

A silicate material, comprising a silicate domain and one or more substantially nonsilicate domains. The material is produced by mixing a templating mixture with a precured resin and one or more resin precursors. The templating mixture is preferably comprised of one or more surfactants, one or more alcohols and water. A precured resin is formed by reacting one or more silicate resin precursors with water, and preferably in the presence of a co-solvent and a catalyst. The precured resin is mixed with the templating mixture and preferably with an additional amount of one or more silicate precursors. The invention also includes a method for fabricating the silicate material, a holographic medium, an optical article, and a method for fabricating an optical article.

36 Claims, No Drawings

SILICATE MATERIAL AND PROCESS FOR FABRICATING SILICATE MATERIAL

BACKGROUND OF THE INVENTION

1. Field of the Invention

The invention relates to silicate materials comprising silicate domains and one or more substantially nonsilicate domains, in particular to porous silicate materials, a method for fabricating a silicate material, an optical article, a method for fabricating an optical article and a holographic medium.

2. Discussion of the Related Art

Silicate materials with designed porosity have many applications, some of which include applications in the chemical, optical and electronics industries. Porosity is typically introduced by incorporation of surfactant or polymeric templates into sol-gel-like reaction mixtures. The high surface area and specific pore structure of porous silicate materials contribute to their value in chemical separations, sensing, biomaterials, and catalysis. The optical quality of silicates in general suggests their use in fabricating claddings, waveguides, switches, holographic storage media, and other active elements, especially when filled with organic phases. The tunability of the electrical properties of the pores, which in principle can encompass air, solid insulators, semiconductors, metals, or other constituents, makes porous silicates attractive for electronic devices such as low-dielectric constant barriers or high-dielectric constant capacitors. Additionally, porous silicates, when impregnated with photosensitive materials, can serve as media for optical data recording.

It is known to prepare mesoporous silica plates with centimeter-scale lengths and widths and 0.5-mm thickness by codissolving Tetraethoxysilane (TEOS), a resin precursor, with surfactants and excess water in ethanol-heptane, then partially curing and casting the material. Ryong Ryoo et al., Optically Transparent, Single-Crystal-Like Oriented Mesoporous, Silica Films and Plates, J. Phys. Chem. B, Vol. 101, No. 50 (1997). In Ryoo's process some solvent (but probably not all) is removed from the gelling mixture before casting the final shape. No resin is isolated in the process.

It is also known to employ TEOS as a resin precursor with block polyether glycol copolymer templates to form porous fibers and powders. Galen D. Stucky et al., Triblock-Copolymer-Directed Syntheses o[0086] Large-Pore Mesoporous Silica Fibers, Chem. Mater., Vol. 10, No. 8 (1998).

Thin films have been prepared by using vinyltrimethoxysilane as an additive in a tetramethoxysilane (TMOS)-based precursor mixture. Makoto Ogawa et al., Preparation of Self-Standing Transparent Films of Silica-Surfactant Mesostructured Materials and the Conversion to Porous Silica Films, Adv. Mater., 10, No. 14 (1998). The method described in Ogawa et al. includes dissolving water in a TMOS-based mixture. Some oligomerization of the silicate monomers begins before surfactants are added, but the intermediate resin is not isolated from the volatile byproducts before forming the films.

Other silica materials known in the art include powders templated with nonionic polyethylene oxides and amines, respectively, synthesized from TEOS mixtures (Thomas J. Pinnavaia et al., Unstable Mesostructured Silica Vesicles, Science Vol. 282 (Nov. 13, 1998); Louis Mercier, Direct Sythesis of Functionalized Silica by Non-Ionic Alkylpolyethyleneoxide Surfactant Assembly, Chem. Commun., pp. 1775–1776 (1998)) and gel bioencapsulants, notable for their high glycerol content and low conversion to silicate network, formed by mixing glycerol into a TEOS resin. Iqbal Gill et al., Encapsulation of Biologicals within Silicate, Siloxane, and Hybrid Sol-Gel Polymers. An Efficient and Generic Approach, J. Am. Chem. Soc. 120, pp. 8587–8598 (1998).

It is further known that the "L3" phase formed by a mixture of cetylpyridinium chloride (CPC), hexanol, and water can be used to template the growth of an ordered silicate solid from TMOS. The method provides good optical clarity and pore uniformity, but the solid products are extremely unstable to air, pulverizing spontaneously upon evaporation of volatiles. The curing process requires elevated temperatures (i.e. above room temperature) and long times, and gives products containing no more than 25% silica. K. M. McGrath et al, Formation of a Silicate $L_3$ Phase with Continuously Adjustable Pore Sizes, Science Vol. 277 pp. 552–555 (1997). Additionally, a procedure for the synthesis of a pre-oligomerized resin from TMOS has been devised. Adachi and Sawai, Japanese Patent No. 07048454 A2 950221 Heisei.

It is advantageous to provide silicate materials with high silicon content that are more stable to annealing, drying and solvent exchange than analogs made from purely monomeric silicates.

It is further advantageous to provide silicate materials that have lower curing temperatures and shorter curing durations than known analogs.

It is also advantageous to provide silicate materials that can be formed into monoliths with thicknesses above 1 mm.

It is also advantageous to provide silicate materials with optimum mechanical strength and optical clarity.

It is further advantageous to provide silicate materials with lessened perturbation of the templating phase during resin cure.

SUMMARY

The invention relates to a silicate material, comprising silicate domains and one or more substantially nonsilicate domains. The material is produced by mixing a templating mixture with a precured resin and preferably one or more resin precursors. The templating mixture preferably comprises one or more surfactants, one or more alcohols and water. A precured resin is formed by reacting one or more silicate resin precursors with water, preferably in the presence of a co-solvent and a catalyst. The precured resin is mixed with the templating mixture and preferably with an additional amount of one or more silicate precursors. Once the material has solidified, solvent may be exchanged within the substantially nonsilicate domains.

The invention also includes a process for producing a silicate material.

The invention further includes an optical article, a method for fabricating an optical article and a holographic medium.

DETAILED DESCRIPTION OF THE INVENTION

The invention relates to a silicate material comprising silicate domains and one or more substantially nonsilicate domains, in particular to porous silicate materials, a method for fabricating a silicate material, and a holographic method utilizing a silicate material. ("Nonsilicate domains" as used herein shall include "substantially nonsilicate domains")

The silicate materials of the invention are derived from pre-oligomerized resins, designed for maximum silicon content in the final product. The materials are particularly stable to annealing, drying, and solvent exchange compared to analogs made from purely monomeric silicates. Advantageously, the silicate material can be formed into monoliths with thicknesses greater than about 1 mm. Template and resin compositions and processing conditions can be varied to optimize the structural integrity and optical clarity of the silicate materials. An additional advantage of the invention is believed to be the lessened perturbation of the templating phase during resin cure because of the reduced amount of alcohol-leaving group expelled.

The term silicate, used herein, means a substantially crosslinked network generally derived from tetra-oxygenated silicon species, including, but not limited to, materials that are predominantly silicon oxide. Materials in which trioxygenated silicon is incorporated, such as those derived at least in part from organotrialkoxysilanes, are also considered silicates for the purposes of the invention. Incorporation of other element oxides into silicates, for example, Ge, B, Al, Ti and/or Zr oxides, by incorporation of their precursors into resin precursor mixtures is also within the scope of the invention.

As the volume percent of silicate in the material increases the structural strength increases. It is generally preferred for the silicate domain to comprise greater than about 15 volume percent. However, it is sometimes necessary to balance structural integrity with other desirable characteristics provided by the substantially nonsilicate domain. For example, for holographic applications, wherein the nonsilicate domain is a photosensitive medium, the photosensitive medium preferably comprises greater than 10 volume percent, more preferably greater than 20 volume percent, and most preferably greater than 25 volume percent of the material. Where a low dielectric constant (low-k) material is desired, the nonsilicate domain is generally a gas or vacuum, preferably comprising greater than 10 volume percent, more preferably greater than 20 volume percent, and most preferably greater than 25 volume percent of the material.

Materials have been produced with nonsilicate domains comprising the following: atmospheric gases, solvents, surfactants, monomers, and polymers. Domains comprising monomers may further comprise polymerization photoinitiators. It is also understood that the following components may be used in nonsilicate domains: oligomers, conductors, semiconductors, high dielectric constant materials, high or low refractive index materials, and precursors to the previously-listed materials. Furthermore, it is understood that a combination of any of the above second constituents may be utilized to form silicate materials within the scope of the invention.

The process by which the silicate materials may be formed can be divided into the following five general steps: 1) template formation; 2) initial resin formation; 3) final resin mixture formation; 4) shaping and curing; and 5) modification of the nonsilicate domain.

The templating mixture provides a means to tune the material morphology. The phase arrangement produced by the templating mixture generally depends on the quantity and types of mixture components. The templating mixture preferably comprises one or more surfactants, one or more alcohols and water. The surfactant(s) is preferably selected from the group comprising cetyltrimethylammonium bromide (CTAB), Brij 30™ (the monododecyl ether of tetraethylene glycol) and cetylpyridinium chloride (CPC). Other surfactants with similar molecular functionality, i.e. a chain such as an alkyl or alkylaryl group of about 10–20 carbon atoms, having a nonpolar or hydrophobic end, and a polar or hydrophilic end comprising a group such as a quaternary ammonium, ethylene oxide oligomeric unit, sulfonate, sulfate, phosphate, or phosphonate group, are contemplated for use in the invention. Other molecular connectivity that produces a similar arrangement of polar and nonpolar functionalities are also contemplated for use in the invention. The surfactant can also be a mixture of surfactants.

The alcohol(s) is preferably a moderately polar alcohol which has about four to about ten carbon atoms and an OH group at or near the end of the chain. Examples of moderately polar alcohols include, but are not limited to, 1-pentanol, 1-hexanol, 1-heptanol, 1-octanol, and alcohols of similar polarity such as a 2-hexanol or 2-methyl-1-pentanol. The alcohol can also be a mixture of alcohols.

A catalyst, as discussed below, is also desirably incorporated into the templating mixture, to promote curing of the final resin mixture. The catalyst or other additives may also be chosen to favorably influence the micro structure of the templating mixture.

The initial resin formation step typically includes partially reacting a silicate resin precursor with water, in the presence of a cosolvent and a catalyst and preferably above ambient temperature. Resin formation generally takes place at temperatures of about 120° C. but may take place at other temperatures, depending on the specific components used. During the reaction volatile components are substantially removed. The cosolvent may be selected from the group comprising methanol, ethanol, 1-propanol and isopropanol or a mixture thereof. It is also understood that this step may be performed without a cosolvent, and without a catalyst.

Advantageously, the use of a cosolvent assures homogeneous mixing of the resin precursor with the water and catalyst, preventing undesirable inhomogeneities in the reaction such as formation of gel particles. It is preferable that the cosolvent be volatile, so as not to become excessively incorporated in the resin or the final material. Where the cosolvent and the alcohol expelled by the hydrolyzing and condensing silicate precursors are not identical, it is advantageous for the cosolvent to promote the volatilization of the expelled alcohol, for example, by formation of an azeotrope.

The catalyst is typically a volatile acid and is generally selected from the group comprising HCL, $BCl_3$, $SiCl_4$, $HNO_3$, $CF_3COOH$, and HBr. The catalyst provides sufficient acidity for the hydrolysis and condensation of the silicate precursors to proceed at a convenient rate. The acidic function can be provided by a catalyst reagent directly, or by chemical transformation of a reagent, such transformation occurring, for example, through hydrolysis, thermal decomposition, or photoinduction. Preferably, the catalyst or catalyst byproducts do not deleteriously affect subsequent-desired activity of the material, e.g. for a holographic application, the catalyst should not promote the degradation of the recording medium, and for a low-k dielectric, should not lead to undesired dielectric breakdown. Catalysts selected from the group described above are also suitable for incorporation into the templating mixture or final resin mixture.

The resin precursor may be selected from the group comprising methyltrimethoxysilane, triethoxysilane, 1,4-bis (trimethoxysilylethyl) benzene (BSEB), tetraethoxysilane (TEOS) and tetramethoxysilane (TMOS) and mixtures comprising these silanes. Other small tetraalkoxy and trialkoxy silanes and silanes generally with three or four leaving groups, such as mixtures of chloro, acetoxy, and alkoxy groups, can be incorporated into the resin precursor.

Dialkoxysilanes and monoalkoxysilanes may be incorporated, but not in quantities that unduly lower the crosslink density and thereby lead to softening of the final silicate material. Silanes with larger substituents, such as phenyl rings, may be incorporated, and such substituents may impart desirable functionality, such as a high refractive index. Again, these should not be introduced in quantities large enough to adversely affect the microstructure or mechanical strength of the final silicate material. Similar considerations apply to other element oxides that may be incorporated. The precursor compounds should be chosen so that their reactivity is suitable for forming a homogeneous resin, i.e. not so reactive as to preclude forming a homogeneous mixture with water and cosolvent, and in cases where a resin precursor mixture is used, one component of the mixture should not be so much more or less reactive than another that the less reactive precursor is not sufficiently incorporated into the resin.

Certain advantages are associated with particular resin precursors. For example, TMOS provides a high volume fraction of silicate domain, leading to high mechanical strength, because of the relatively small size of the alcohol (methanol) expelled when the resin derived therefrom is cured, compared to, for example, the ethanol expelled from TEOS-based resins. The use of exclusively tetra-oxygenated silicate precursors leads to silicate domains that are largely $SiO_2$, which imparts a high modulus and low coefficient of thermal expansion to the final material. On the other hand, incorporation of organotrialkoxysilanes leads to silicate domains in which organosilyl groups are retained. These can impart increased toughness and a more hydrophobic silicate domain surface that would be desirable where the nonsilicate domains are to be filled with nonpolar materials. The use of organic groups bridging more than one trialkoxysilane as resin precursors provides the advantage associated with organosilanes without unduly sacrificing crosslink density.

The final resin mixture formation includes combining the precured resin from the initial resin formation step, with the templating mixture, and preferably with an additional amount of resin precursor to form the final resin mixture. The additional resin precursor can be the same as was utilized in the initial resin formation step. It is also understood that a different resin precursor may be used in the final resin mixture formation step.

Advantageously, it has been found that final resin mixture formation accomplished by including a substantial amount of precured resin produces more stable materials than if the precured resin had not been utilized. The materials are more stable to annealing, drying and solvent exchange. Additionally, thicker material may be formed by this process. Also, advantageously, less perturbation of the templating phase by expelled alcohol is achieved because less alcohol is expelled during curing than if no precured resin has been used.

Formation of the material shape has been accomplished by molding, but it will be understood by those skilled in the art that formation techniques may include casting, printing, extruding, injection molding, coating or the like. Materials may be further contoured after the initial shaping by methods such as carving, skiving, embossing or the like. The material may be fully or partially cured prior to shaping. Partially cured material may continue to cure during the shaping process. Curing has been performed at room temperature but, as will be appreciated by those skilled in the art, curing may be done at other temperatures or by exposure to other energy sources, for example microwave energy or ultra violet light.

Shaped and cured materials may be released from their containers or apparatus into a gaseous atmosphere or a liquid medium. The gaseous atmosphere can be air or constituents of air or other common gases or solvent vapors. Liquids can include, but are not limited to, solvents such as methanol, ethanol, isopropanol, butanol, combinations of these solvents, and mixtures of these solvents with water. Materials released into solvents have been found in some cases to be more stable to further manipulation such as heating and exchange of nonsilicate domain constituents than if released directly into air. Solvents are advantageously selected so that their interactions with silicate domain surfaces are closely matched to the interactions between the surfaces and the materials that already constitute the nonsilicate domains. In cases where it is desirable for the nonsilicate domain composition to be altered, especially by addition of a quantity of a solvent, it is advantageous that the solvent be miscible with materials that are to be removed from the nonsilicate domains. In such cases, the removed material is extracted by the solvent and most of the extract is advantageously transported to a solvent pool outside the silicate material.

The characteristics of the final material may be varied by varying the types and ratios of mixture components for templating and resin formation, and varying process conditions. Component variables that may be adjusted include, resin and surfactant molecular weight and functionality, water concentration, the nature of the alcohols, resin precursors, and catalysts, and the reactivity of resins and resin precursors. Process condition variables include, duration and method of mixing and degassing, temperature and duration of curing, and the degree to which volatiles are retained or released at different stages of cure.

Characteristics that can be adjusted by the above-mentioned variations include, but are not limited to, porosity, dielectric constant, structural stability, refractive index contrast and reactivity. Pores comprising a gas or vacuum tend to lower the dielectric constant of the material. If the pores are isolated from one another, dielectric breakdown is minimized. Advantageously, the dielectric constant is less than 3. The lower the dielectric constant, the lower the capacitive contribution to the delay time of a circuit employing the material as an insulator, and the less material needed to isolate electrical layers from one another. Thin dielectrics are particularly useful in the electronics industry where it is desirable to minimize device size, for example, as in ultra large scale integration.

Interconnected pores are desirable for holography applications where migration of molecules, such as monomers, within the material is necessary. Often existing materials for holography applications, such as Corning Glass' Vycor®, have rigid networks with small pores and have less ability to allow molecule movement than the silicate material of the present invention. Structural stability and reactivity can also be varied to optimize the material for a particular application.

Nonsilicate domains may be introduced into the material during or after resin formation and may be further adjusted after introduction into the material. Nonsilicate domains may be introduced by fluid exchange using techniques such as, vapor transport, solvent exchange, supercritical extraction, vacuum or drying.

As part of the process of adjusting the composition of the nonsilicate domains, the material may be immersed or heated in the presence of a fluid. Such fluids may be atmospheric gases, solvents, solvent vapors, and supercritical solvents. Examples of solvents that have been employed with the materials of the invention include, isopropanol, cyclohexanol, and toluene. Additionally, it will be understood by those skilled in the art that solvents may include, but are not limited to, alcohols, aromatic and alicyclic hydrocarbons, esters, ethers, and halogenated hydrocarbons. It is also possible for the solvent to comprise a mixture of these compounds. It is further possible for the solvent to comprise one or more solutes that need not necessarily be liquids in their pure forms. The solutes may comprise or be reagents that produce, oligomers, conductors, semiconductors, high dielectric constant materials, and/or high or low refractive index materials. Reactive compounds, may also be employed as solvents, for example, polymerizable monomers and photoinitiators, or precursors to materials with specific activities such as electrical conductivity or polarizability. As discussed above, where it is desirable to extract material from the nonsilicate domains, it is preferable that the material to be extracted be miscible, and more preferable that it be substantially soluble, in the solvent.

Supercritical solvents are an advantageous class of fluids. The use of these fluids in producing porous silicate materials is discussed in C. J. Brinker, "*Sol-Gel-Science*", Academic Press, New York (1990). Supercritical solvents facilitate material exchange in the nonsilicate domains with much less cracking and other deformation, because the capillary forces involved in the introduction and removal of supercritical fluids are much less than those associated with conventional solvents. Suitable solvents include, but are not limited to, inert compounds such as $CO_2$ and hydroxylic solvents. Treatment with supercritical solvents results in materials with nonsilicate domains substantially free of condensed phase material, providing desirable properties such as low dielectric constant. Alternatively, the free volume in the nonsilicate domains may be exchanged for compounds with specific properties or activities, as discussed above.

It is also possible for material to be removed from the nonsilicate domains by vacuum action.

It is possible for solvent treatment to modify the silicate domains, especially when the process comprises heating. For example, the domains may become further crosslinked, and/or the functional groups on the surfaces may be changed. These changes may be advantageous, in that they can lead to enhancements in properties such as mechanical strength and wettability of nonsilicate domain material.

Initial experiments were performed to evaluate silicate materials formed without precuring a resin. Comparative Example 1 describes formation of such a silicate material.

COMPARATIVE EXAMPLE 1

A mixture of 6 g of cetylpyridinium chloride (CPC), 5 g of hexanol, and 11 g of 0.2 M hydrochloric acid (HCl) in water was stirred for about ten minutes, until a substantially translucent, viscous solution formed (L3 phase). Half the stoichiometric amount of tetramethoxysilane (TMOS) (24.7 g which represents one quarter the number of moles of water) was added to the hexanol mixture. The mixture clarified and became warm. After 20 minutes of stirring, a portion of the solution was shaped by pouring it into molds made from o-rings glued with epoxy onto glass slides. The molds were covered with additional glass slides clamped in place. After solidification, solvent exchange was performed with hydroxyethyl acrylate. However, all attempts to remove solvent from the material resulted in severe cracking, and the structural integrity of solvent-exchanged samples was erratic. Additional experiments were performed wherein shaping was accomplished using capped glass containers as molds. Photoinitiator (bis(eta-5-2,4-cyclopentadien-1-yl)bis [2,6-difluoro-3-(1H-pyrrol-1-yl) phenyl]titanium, available from Ciba as CGI-784) was incorporated with the hydroxyethyl acrylate during solvent exchange. The hydroxyethyl acrylate was photocured by the action of visible light, with surprisingly little loss of transparency, such that the material can be advantageously used for fabrication of optical articles.

The material and process from Comparative Example 1 were evaluated and formulations were developed to overcome the shortcomings of the Example 1 material. Materials with increased structural integrity were successfully fabricated by introducing precured resins, into materials such as those of Example 1. Introduction of the precured resins provided additional stability and reduced the curing time of the materials. The following examples describe such formulations.

EXAMPLE 2

The same process was used as in Example 1 but CPC was replaced by CTAB. This produced a more transparent material.

EXAMPLE 3

TMOS was hydrolyzed with one mole equivalent, or half the stoichiometric amount of water, with one drop of concentrated HCl per 20 g of TMOS and sufficient methanol, about 25 weight percent, to provide homogeneity. The TMOS mixture was heated slowly over several hours, to a temperature of about 120–130° C., substantially boiling away volatile components. A substantially clear, viscous resin was obtained. This oligomer was used to replace 75–80% of the TMOS in the Example 1 recipe (100% replacement caused bubbling and other inhomogeneities). Materials were produced that could be solvent exchanged after cure with isopropanol and 3:1 acetonitrile-isopropanol. Molded pieces were released directly into isopropanol. Release was made easier by coating one or both mold surfaces with thin sheets of fluorinated polymers or silicone grease. The pieces were then annealed in refluxing isopropanol. Solvent exchange with hydroxyethyl acrylate containing photoinitiator, and subsequent photocure under $N_2$ was accomplished. Supercritical extraction was performed in isopropanol which produced a porous, transparent material. A BET adsorption isotherm experiment was conducted to determine whether pores were present. The procedure evaluates movement of gases into and out of the material and determines the sample's surface area. The results indicated presence of interconnected pores.

EXAMPLE 4

Materials with greater structural integrity, 1–2 $cm^2$ in area, were obtained when an oligomer of TMOS analogous to that described in Example 3, but made with 60% of the stoichiometric amount of water, the maximum possible to avoid premature gelation, was used and annealing was done above the refluxing temperature in a sealed tube, with HCl introduced directly or as $SiCl_4$. The materials were stable to solvent exchange with nonpolar solvents such as toluene or phenoxyethyl acrylate. Vapor transfer exchange with cyclohexanol, increasing the cyclohexanol vapor pressure of an ambient atmosphere at the expense of isopropanol, was also accomplished. Silicon nuclear magnetic resonance (NMR) showed that the annealing substantially increased the degree of conversion of the Si species to $SiO_2$ groups, so that most of the Si was quadrupally bonded to the network.

The silicon content was increased further by raising the amounts of silicate precursors relative to the templating mixture. It was found that use of the minimum amount of pressure necessary to seal the mold produced a substantially crack-free material.

EXAMPLE 5

A BSEB resin was prepared by mixing 40.5 g TMOS, 8.0 g BSEB, 12 g methanol, 5.5 g water (51% of the amount needed to substitute for all of the methoxy), and 8 drops of concentrated HCl. The mixture was heated to 120° C. which substantially removed volatile constituents. A surfactant mixture was prepared with Brij30-water-hexanol 2.5:2:1 with one drop of concentrated HCl per gram of hexanol. The BSEB resin, hexanol surfactant mixture, and TMOS were combined in a ratio of 1.0:0.55:0.14 (110% of the stoichiometric amount of water). After the mixture clarified, it was molded within 15 minutes as a thick film within o-rings on fluorinated polyimide sheets taped to glass slides, and covered with additional polyimide sheets wet with the sol mixture on slides. The samples were uncovered 20 minutes after gelling. Substantially round, clear, crack-free samples, about 1–3 cm in diameter, and about 1.5 mm thick were obtained. The material was annealed in air by heating it in a forced-air oven to 110° C. over two days without loss of structural integrity. Samples cured for longer times in closed molds absorbed dye, possibly indicating the presence of interconnected pores, but were less stable mechanically.

EXAMPLE 6

A surfactant mixture was prepared with Brij 30-water-octanol 3.0:4.0:4.8 with one drop of concentrated HCl per 3 g of Brij. The BSEB resin of Example 5, octanol mixture, and TMOS were combined in a 1.0:0.52:0.10 ratio (100% of the stoichiometric amount of water). After the mixture clarified, it was cast within 15 minutes as a thick film within o-rings on fluorinated polyimide sheets taped to glass slides, and covered with additional polyimide sheets wet with the sol mixtures on slides. The samples were uncovered 1 hour after gelling. Substantially round, clear, crack-free samples, about 1–3 cm in diameter, and about 1.5 mm thick were obtained. The material was annealed in air by heating it in a forced-air oven to 110° C. over two days without loss of structural integrity. Samples cured for longer times in closed molds had interconnected pores but were less stable mechanically. Dielectric constants of 3–6 were measured on the materials.

The avoidance of cracking depends in part on the rate and energy of solvent evaporation and the mechanical state of the material during the evaporation. If drying is begun while the material is rubbery, there is little stress because only a low level of volatiles would have been produced at that point, a high surface area would not have been established (so the energy of evaporation would be low), and the material could easily relax to accommodate the volume freed by the departing solvent. Such a process would not be expected to produce a network of small, highly interconnected pores. On the other hand, waiting until the glassy state is reached before evaporation results in a greater amount of volatile material present at the beginning of the drying, leading to a greater initial rate of solvent removal and a higher initial surface destabilization, and more hindered relaxation of the material in response to solvent loss. The result is a more porous material, but one more likely to crack on exposure to air.

It is believed that the silicate materials described above can be advantageously utilized in the formation of holograms. As previously noted, the silicate materials have larger pores and allow for less hindered molecule movement than existing materials such as Corning Glass' Vycor®. Additionally, greater material thicknesses can generally be achieved with the silicate material of the invention than with conventional photosensitive polymer films.

For holographic applications the silicate material would be formed with interconnecting pores and desired rigidity and light scattering properties. The nonsilicate domain would be a photoimageable system.

The photoimageable system would typically comprise one or more photopolymerizable components, for example, photoactive monomers or oligomers, and optional additives such as a photoinitiator, diffusion agents, or additional oligomers or polymers. Some of these constituents may be substantially less reactive and/or mobile during the holographic recording process than others. These less reactive and/or mobile constituents are termed the "matrix". It is believed that lower viscosity photoimageable systems ease pore filling. However, while consideration should be given to photoimageable system viscosity, it may be necessary to trade optimum viscosity for other desired properties. Conventional laboratory techniques may be employed to fine tune formulations accordingly.

The photopolymerizable component would typically comprise one or more monomers and/or oligomers capable of photoinitiated polymerization leading to hologram formation. Photoactive monomers which polymerize by a free-radical reaction are generally suitable, including, but not limited to molecules containing ethylenic unsaturation such as acrylates, methacrylates, styrene, substituted styrenes, vinylnaphthalene, substituted vinylnaphthalenes, and other reactive vinyl derivatives. Free-radical copolymerizable pair systems, such as vinyl ether mixed with maleate, are also suitable.

Acrylate-based components such as poly(ethyleneglycol) diacrylate oligomer or di(ethyleneglycol) ethyl ether acrylate monomer, or a combination thereof, are believed to be desirable photopolymerizable components because their relatively flexible polyether backbones would provide relatively low $T_g$, which is believed to ease diffusion. The mixture's relatively low viscosity, would ease filling of pores. Other oligomers and monomers having like characteristics are expected to be similarly useful in the invention.

The photoimageable system would typically contain a photoinitiator. The photoinitiator chemically initiates polymerization of the photopolymerizable component by exposure to relatively low levels of the recording light. This negates the need for direct light-induced polymerization.

A variety of photoinitiators known to those skilled in the art and available commercially are suitable for use in the invention. It is advantageous to use a photoinitiator that is sensitive to light in the visible part of the spectrum, particularly at wavelengths available from conventional laser sources.

Free-radical photoinitiators of dye-hydrogen donor systems are expected to be suitable for use in the invention. Examples of such dyes include eosin, rose bengal, erythrosine, and methylene blue, and suitable hydrogen donors include tertiary amines such as n-methyl diethanol amine. An exemplary photoinitiator is CGI-784.

It should also be possible to use other additives in the photoimageable system, e.g., inert diffusing agents having relatively high or low refractive indices or photoactive components designed to improve refractive index contrast. Where photoimaging produces a difference in density or free volume in irradiated versus nonirradiated regions, such differences may contribute to refractive index contrast.

It is believed that the photoimageable system can be incorporated into the pores by conventional techniques. Typically, the porous body is immersed in the photoimageable system and soaked for a length of time sufficient to adequately fill the pores. Adequate filling is defined by substantially uniform filling throughout the thickness of the porous body. Adequate filling of the pores minimizes undesirable light scattering caused by pockets or voids. Vacuum filling is another possible technique, and comprises drawing air from the pores by placing the porous body under vacuum, then immersing it in the photoimageable system without exposure to atmospheric pressure.

It will also be understood by those skilled in the art that the materials of the invention will be useful for a variety of other optical articles (optical articles being articles that rely on the formation of refractive index patterns or modulations in the refractive index to control or modify light directed to them). Such articles include, but are not limited to, waveguides, beam steerers, and optical filters.

For applications such as holography, waveguides, or the like, it is advantageous to fabricate a material with a high refractive index contrast between exposed and unexposed regions of the material. A relatively high refractive index contrast provides, for example, improved readout in recording media and efficient light confinement in a waveguide. The refractive index contrast, $\Delta n$, is conventionally known, and is defined as the amplitude of the sinusoidal variations in the refractive index of a material in which a plane-wave, volume image has been written. Advantageously, the material of the invention exhibits a $\Delta n$ of $3\times10^{-3}$ or higher.

One way to provide high index contrast in the invention is to use a photoactive monomer having moieties (referred to as index-contrasting moieties) that are substantially absent from other constituents of the photoimageable system that are referred to as the matrix, and that exhibit a refractive index substantially different from the index exhibited by the bulk of the matrix. For example, high contrast can be obtained by using a matrix that contains primarily aliphatic or saturated alicyclic moieties with a low concentration of heavy atoms and conjugated double bonds (providing low index) and a photoactive monomer made up primarily of aromatic or similar high-index moieties. It is advantageous to induce this relatively large index change with a small number of monomer functional groups, because polymerization of the monomer generally induces shrinkage in a material.

Such shrinkage has a detrimental effect on the retrieval of data from stored holograms, and also degrades the performance of waveguide devices such as by increased transmission losses or other performance deviations. Advantageously, the porous body is designed to resist this shrinkage. However, such shrinkage can still create undesirable stress on the porous body, and is therefore advantageously minimized. Lowering the number of monomer functional groups that are polymerized to attain the necessary index contrast is therefore desirable. This lowering is possible by increasing the ratio of the molecular volume of the monomers to the number of monomer functional groups on the monomers. This increase is attainable by incorporating into a monomer larger index-contrasting moieties and/or a larger number of index-contrasting moieties. For example, if the matrix is composed primarily of aliphatic or other low index moieties and the monomer is a higher index species where the higher index is imparted by a benzene ring, the molecular volume can be increased relative to the number of monomer functional groups by incorporating a naphthalene ring instead of a benzene ring (the naphthalene having a larger volume), or by incorporating one or more additional benzene rings, without increasing the number of monomer functional groups. In this manner, polymerization of a given volume fraction of the monomers with the larger molecular volume/monomer functional group ratio utilizes polymerization of fewer monomer functional groups, thereby inducing less shrinkage. But the requisite volume fraction of monomer still diffuses from the unexposed region to the exposed region, providing the desired refractive index.

The molecular volume of the monomer, however, should not be so large as to slow diffusion below an acceptable rate. Diffusion rates are controlled by factors including size of diffusing species, viscosity of the medium, and intermolecular interactions. In the present invention, the sizes of pores may also limit the sizes of constituents of the photoimageable system that can diffuse efficiently. Larger species tend to diffuse more slowly, but it would be possible in some situations to lower the viscosity or make adjustments to the other molecules present in order to raise diffusion to an acceptable level. Also, in accord with the discussion herein, it is important to ensure that larger molecules maintain compatibility with the matrix.

Numerous architectures are possible for monomers containing multiple index-contrasting moieties. For example, it is possible for the moieties to be in the main chain of a linear oligomer, or to be substituents along an oligomer chain. Alternatively, it is possible for the index-contrasting moieties to be the subunits of a branched or dendritic low molecular weight polymer.

While the invention has been described in what is presently considered to be preferred embodiments, many variations and modifications will become apparent to those skilled in the art. Accordingly, it is intended that the invention not be limited to the specific illustrative embodiments but be interpreted within the full spirit and scope of the appended claims.

What is claimed is:

1. A method for forming a silicate material having a silicate domain and one or more substantially nonsilicate domains, comprising the steps of:
   forming a templating mixture;
   precuring a resin by reacting one or more silicate resin precursors with water; and
   forming a final resin mixture including said precured resin and said templating mixture.

2. The method of claim 1 wherein the templating mixture comprises one or more surfactants, one or more alcohols, and water.

3. The method of claim 2 wherein the surfactant(s) is selected from the group consisting of cetyltrimethylammonium bromide (CTAB), a monododecyl ether of tetraethylene glycol, cetylpyridinium chloride (CPC), and a chain comprising an alkyl or alkylaryl group of about 10–20 carbon atoms having a nonpolar or hydrophobic end and a polar or hydrophilic end, said polar or hydrophilic end comprising a quaternary ammonium, ethylene oxide oligomeric, sulfonate, sulfate, phosphate, or phosphonate group.

4. The method of claim 2 wherein the alcohol(s) is a moderately polar alcohol.

5. The method of claim 1 further comprising reacting said silicate resin precursor(s) in the presence of a cosolvent.

6. The method of claim 5 wherein the cosolvent is selected from the group consisting of methanol, ethanol, 1-propanol and isopropanol or a mixture thereof.

7. The method of claim 1 further comprising reacting said silicate resin precursor(s) in the presence of a catalyst.

8. The method of claim 7 wherein the catalyst is selected from the group consisting of HCl, $BCl_3$, $SiCl_4$, $HNO_3$, $CF_3COOH$, and HBr.

9. The method of claim 1 further comprising precuring said resin above ambient temperature.

10. The method of claim 1 wherein the final resin mixture includes an additional amount of said silicate resin precursor(s).

11. The method of claim 1 further comprising introducing said substantially nonsilicate domain(s) into the material selected from the group consisting of, oligomers, conductors, semiconductors, high dielectric constant materials, high or low refractive index materials, and precursors thereof.

12. The method of claim 1 wherein said substantially nonsilicate domain(s) are introduced into the material by fluid exchange.

13. The method of claim 12 wherein a technique for accomplishing said fluid exchange is selected from the group consisting of vapor transport, solvent exchange, supercritcal extraction, vacuum and air drying.

14. The method of claim 12 further comprising fluid exchange with a constituent selected from the group consisting of isopropanol, cyclohexanol, toluene, aromatic and alicyclic hydrocarbons, esters, ethers, halogenated hydrocarbons, polymerizable monomers, photoinitiators, and a mixture thereof.

15. The method of claim 12 further comprising fluid exchange with a gas.

16. The method of claim 12 further comprising heating said material in a gas.

17. The method of claim 12 further comprising heating said material in a solvent.

18. The method of claim 12 wherein the material, after fluid exchange, has a dielectric constant of less than about 3.

19. The method of claim 1 further comprising shaping the silicate material by a technique selected from the group consisting of molding, casting, printing, extruding, injection molding and coating.

20. The method of claim 19 further comprising releasing the shaped material from its shaping container or apparatus.

21. The method of claim 19 further comprising releasing said shaped material into a solvent selected from the group consisting of methanol, ethanol, isopropanol, butanol, mixtures of these solvents with one another, vapors of these solvents, and mixtures of these solvents with water.

22. The method of claim 1 wherein said silicate precursor(s) have three or four leaving groups.

23. The method of claim 1 wherein said silicate precursor(s) are selected from the group consisting of tetraalkoxy silanes, trialkoxy silanes, dialkoxysilanes and monoalkoxysilanes.

24. The method of claim 23 wherein the trialkoxy silanes are selected from the group consisting of methyltrimethoxysilane, triethoxysilane, and 1,4-bis (trimethoxysilylethyl) benzene (BSEB).

25. The method of claim 23 wherein the tetraalkoxy silanes are selected from the group consisting of tetramethoxysilane (TMOS) and tetraethoxysilane (TEOS).

26. The method of claim 12 wherein the volume percent of the substantially nonsilicate domain(s) is greater than about 10.

27. The method of claim 12 wherein the volume percent of the substantially nonsilicate domain(s) is greater than about 20.

28. The method of claim 12 wherein the volume percent of the subtantially nonsilicate domain(s) is greater than about 25.

29. The method of claim 1 wherein the material formed has a thickness of greater than about 1 mm.

30. The method of claim 1 wherein the volume percent of said silicate domain(s) is greater than about 15.

31. The method of claim 1 wherein said substantially nonsilicate domain(s) is a photoimageable system.

32. The method of claim 31 wherein said photoimageable system comprises one or more monomers and/or oligomers capable of undergoing photoinitiated polymerization.

33. The method of claim 32 wherein the photoimageable system further comprises a photoinitiator.

34. The method of claim 1 wherein the final resin mixture includes a catalyst.

35. A method for fabricating an optical article comprising forming a silicate material, said silicate material comprising a silicate domain and one or more substantially nonsilicate domains, where said silicate material is produced by:

forming a templating mixture;

precuring a resin by reacting a silicate resin precursor with water;

mixing said precured resin with said templating mixture;

shaping by a technique selected from the group consisting of molding, casting, printing, extruding, injection molding and coating.

36. The method of claim 35 further comprising introducing said substantially nonsilicate domain(s) into said medium by fluid exchange.

* * * * *